INVENTOR.
Walter S. Sterling
BY Robert R. Churchill
ATTORNEY

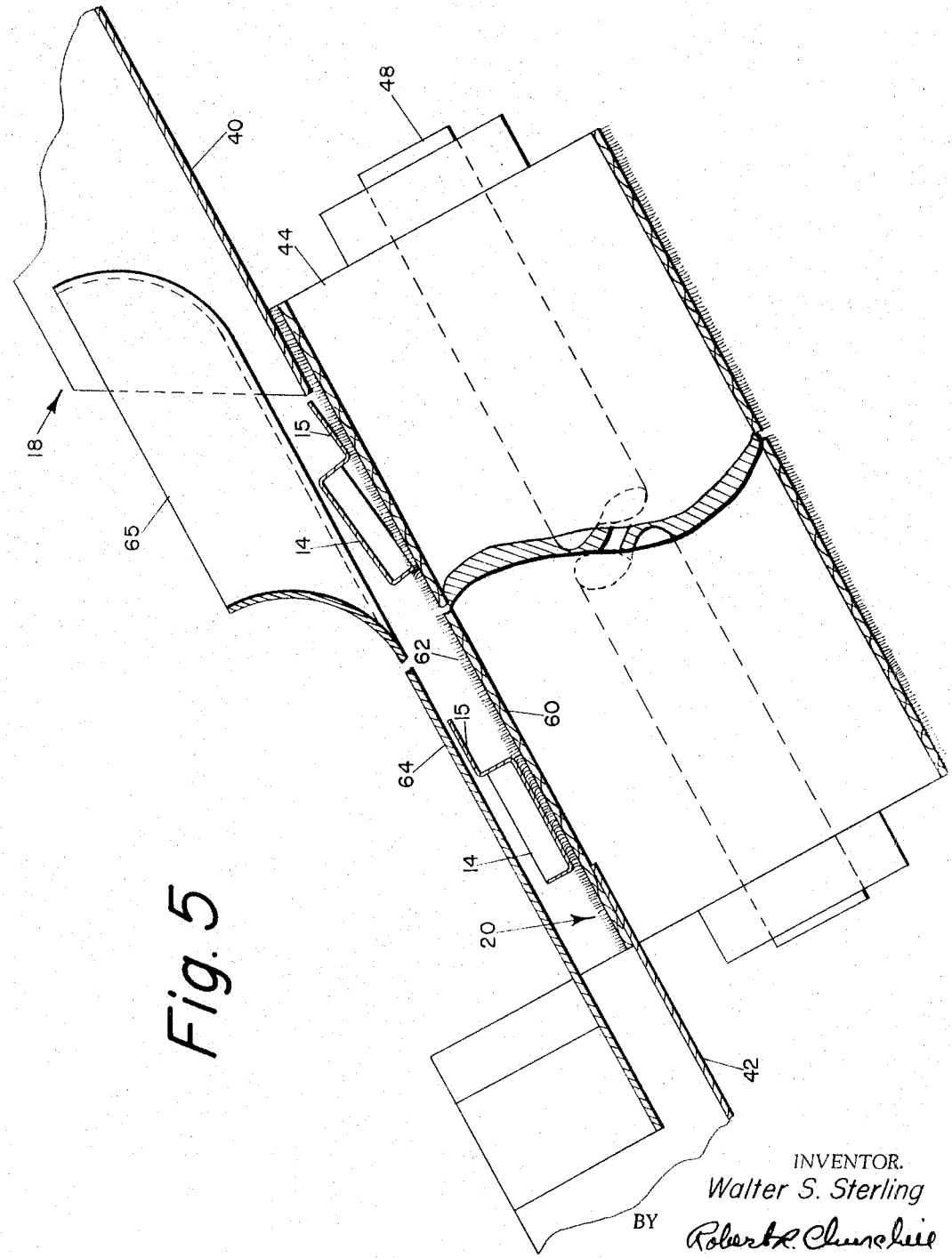

United States Patent Office 3,297,133
Patented Jan. 10, 1967

3,297,133
CLOSURE HANDLING APPARATUS
Walter S. Sterling, Quincy, Mass., assignor to Pneumatic Scale Corporation, Limited, Quincy, Mass., a corporation of Massachusetts
Filed Apr. 13, 1965, Ser. No. 447,676
9 Claims. (Cl. 198—33)

This invention relates to closure handling apparatus and more particularly to apparatus for delivering closures from a bulk supply thereof to a closure handling and orienting machine.

The invention has for an object to provide novel and improved apparatus of the character specified wherein provision is made for preorienting randomly arranged closures during their delivery from the bulk supply to the orienting machine whereby a substantial majority of the closures will pass through the machine and into a feed chute in their oriented condition.

With this general object in view and such others as many hereinafter appear, the invention consists in the closure handling apparatus and in the various structures, arrangements and combinations of parts hereinafter described and particularly defined in the claims at the end of this specification.

In the drawings illustrating the preferred embodiment of the invention:

FIG. 5 is an enlarged detail view of a portion of the preorienting device, as seen from the line 5—5 of FIG. 1.

Figure 1:
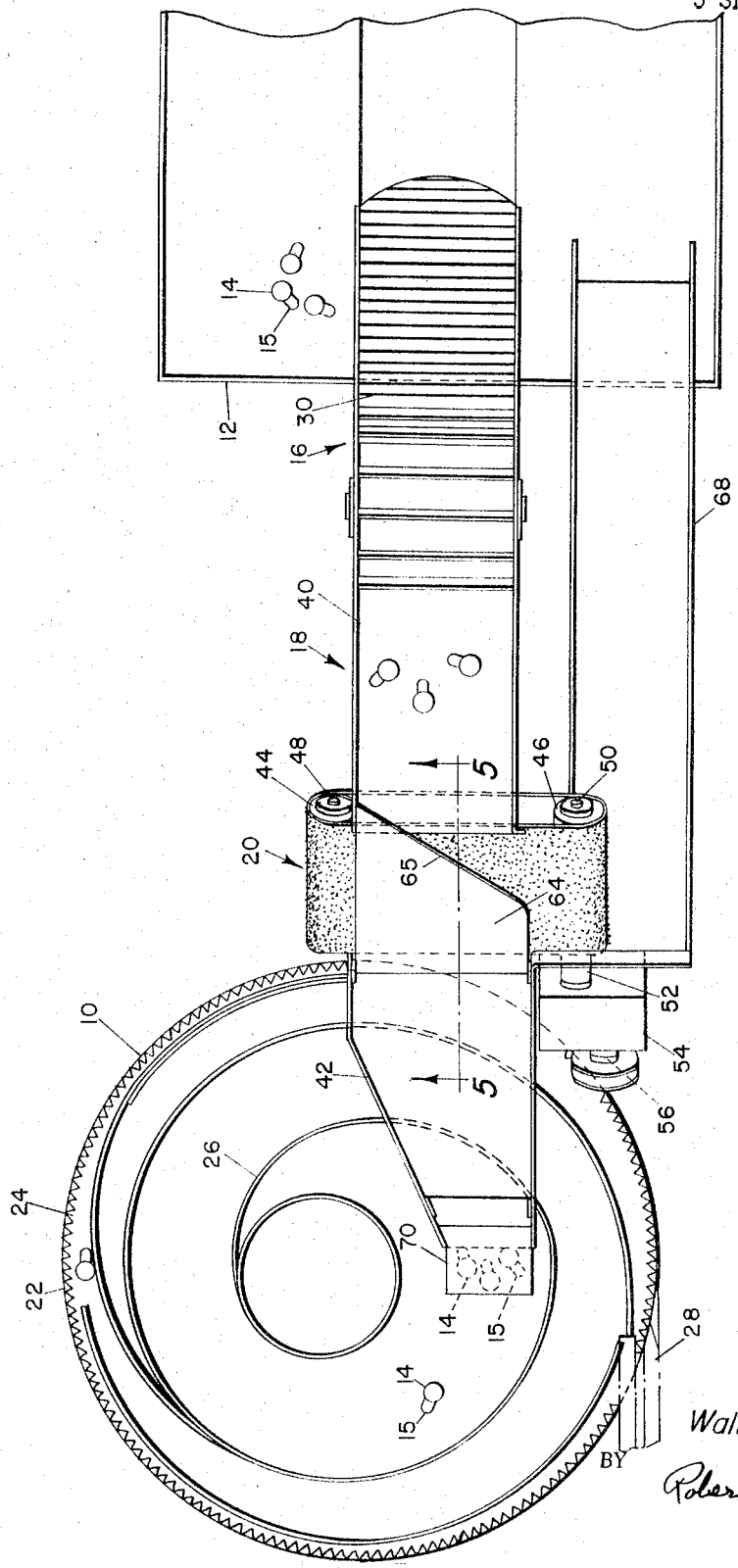
FIG. 1 is a plan view of closure handling and orienting apparatus embodying the present invention.
Figure 2:
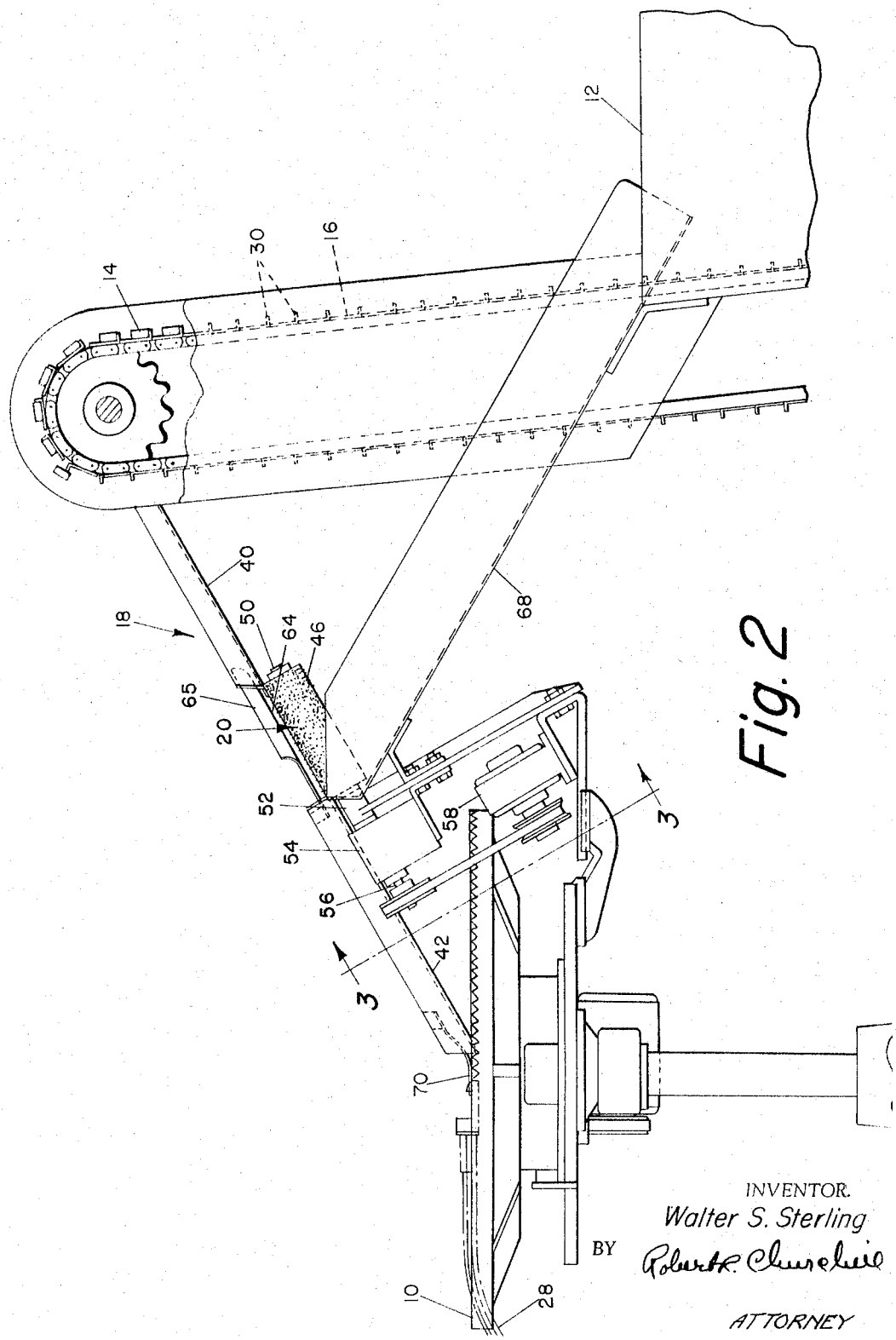
FIG. 2 is a side elevation of the same.

In general, the present invention contemplates novel closure handling apparatus embodying means for preorienting a substantial majority of the closures during their delivery from a bulk supply thereof to a closure handling machine, such as a closure orienting and feeding machine of the type illustrated and described in my copending application, Serial No. 423,911, filed January 7, 1965, for Closure Handling Apparatus. In general, in the operation of such machine, the closures such as bottle caps, herein shown as provided with opening tabs, are withdrawn from a bulk supply thereof by a conveyer and are delivered by the conveyer onto the upper end of a chute. The randomly arranged closures flow by gravity down the chute and are delivered onto a rotary carrier disk forming a part of the orienting mechanism as fully disclosed in my copending application above referred to. In operation, the closures carried around with the disk are aligned into a single line by spiral rails and are guided toward the serrated edge of the disk where those closures assuming a position other than a desired or oriented position are rejected, and those closures assuming an oriented position will maintain their balance on the lands of the serrated edge and will be deposited into a feed chute for delivery to a closure applying machine.

In practice, the unrestricted flow of closures down the chute shown in my copending application, Serial No. 423,911, above referred to, will deliver the closures onto the orienting disk in indeterminate or randomly arranged positions, sometimes with a majority of the closures in their oriented or open end up position, and sometimes with a majority of the closures in their unoriented or open end down position. As a result, when a majority of the closures are initially disposed on the orienting disk in their unoriented position, such closures will be rejected, and a relatively few closures only will be deposited into the feed chute. It will be apparent that under these conditions the supply of oriented closures to the feed chute will be substantially reduced to an extent such as to impair the efficiency of the apparatus.

In accordance with the present invention provision is made for assuring that a substantial majority of the closures delivered to the orienting disk are disposed in an oriented position. In the illustrated embodiment of the invention provision is made for preorienting the closures during their travel down the chute by removing those closures disposed in an unoriented position in the chute so that most of the closures delivered to the orienting disk will be disposed in an oriented position. As a result, substantially all of the closures delivered to the disk will pass through the orienting mechanism to be deposited into the feed chute, and only a relatively few closures will be rejected from the disk, thus increasing the efficiency of the closure orienting and feeding machine to a maximum. In the illustrated embodiment of the invention, the preorienting device comprises a transversely extended, fast moving belt disposed intermediate the ends of the delivery chute, the belt having a surface such as to permit free sliding movement across the belt of those closures positioned with their open ends up, and such as to impede or stop the sliding movement of these closures disposed with their open ends down. As a result, the moving belt will carry the impeded closures laterally out of the chute to be returned to the bulk supply.

Referring now to the drawings, in general, the illustrated apparatus embodying the present invention comprises a closure orienting and feeding machine including a rotary aligning and orienting disk 10; a bulk supply hopper 12 containing a supply of randomly arranged closures 14; and an upright conveyer indicated generally at 16 arranged to withdraw closures from the bulk supply hopper and to deliver the same to the upper end of a delivery chute indicated generally at 18. The closures flow by gravity down the chute onto the rotary orienting disk 10. As herein shown, the chute 18 is provided with a transversely extended, fast moving reject belt 20 intermediate its ends across which the closures must pass and by which those closures disposed with their open ends down are impeded in their flow to be carried out of the chute and returned to the bulk supply, those closures disposed with the closed end down being capable of traversing the belt to be delivered to the orienting disk 10.

The illustrated closure orienting and feeding machine may comprise that shown in my copending application, Serial No. 423,911, above referred to, and in general, such mechanism comprises the rotary disk 10 having a serrated edge 22 providing spaced lands 24. A stationary spiral rail 26 is disposed above the disk and is arranged to guide the closures 14 deposited thereon outwardly and in a single line to present the closures with a portion thereof extended beyond the serrated edge. In operation, if the closures are presented to the serrated edge with their open ends down, the rim of the closure will drop down over the spaced lands 24, with portions of the rim extending down into adjacent serrations to become overbalanced and rejected from the disk. Conversely, those closures which are disposed with their open ends up will be supported on the serrated edge by the closed end of the closure resting on the spaced lands 24 and will be advanced and deposited into a feed chute 28 for delivery to a closure applying machine. While the illustrated closures 14 are shown as provided with opening tabs 15, it will be understood that the machine will handle conventional or tab-free closures with equal advantage.

The upright conveyer 16 is arranged as slightly inclined from the vertical and is provided with a plurality of equally spaced upstanding transversely extended bars 30. The conveyer is arranged to cooperate with the bulk supply hopper 12 to pick up and withdrawn the closures retained by the bars as the conveyer passes through a slotted opening formed in the inclined front wall of the bulk supply hopper. The closures retained on the bars of the inclined conveyer are carried over the upper end of the conveyer where they are released and deposited onto the upper end of the chute 18. Thus, the closures are preferably released onto the chute 18 in controlled amounts as withdrawn from the supply by the spaced bars 30. The conveyer 16 may comprise a chain and sprocket conveyer which may be independently driven by any usual or preferred means, such as shown in my United States Patent No. 3,079,042, issued February 26, 1963.

Figure 3:
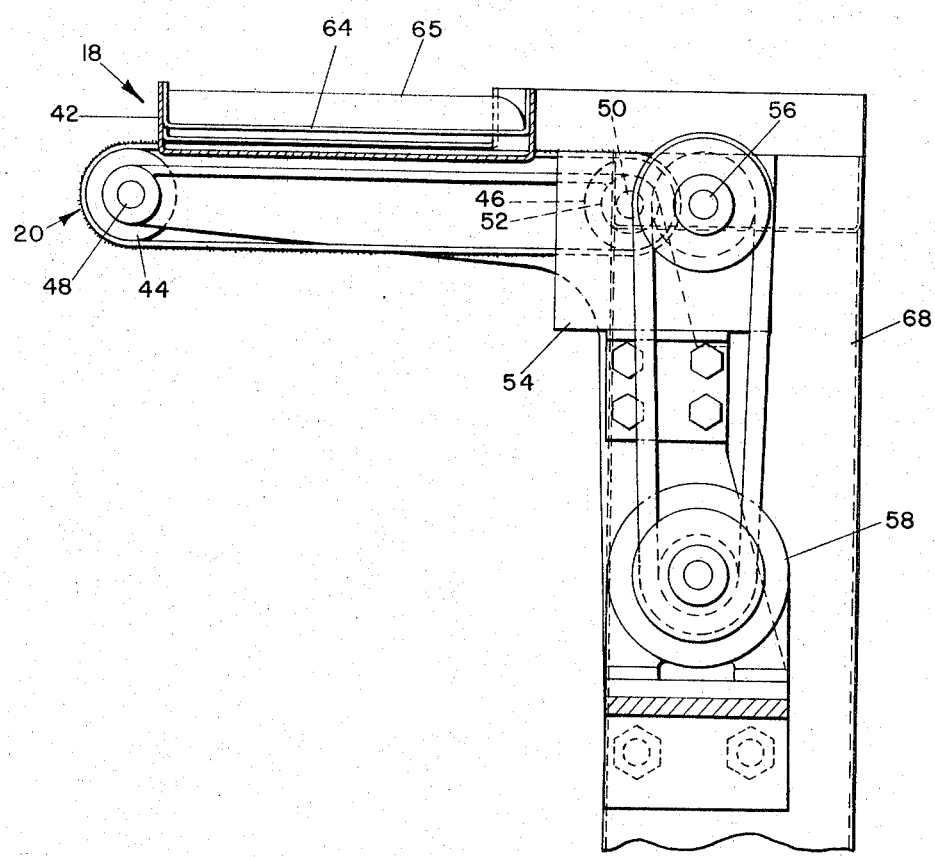
FIG. 3 is a cross sectional detail view in front elevation of the preorienting device as taken on the line 3—3 of FIG. 2.
Figure 4:
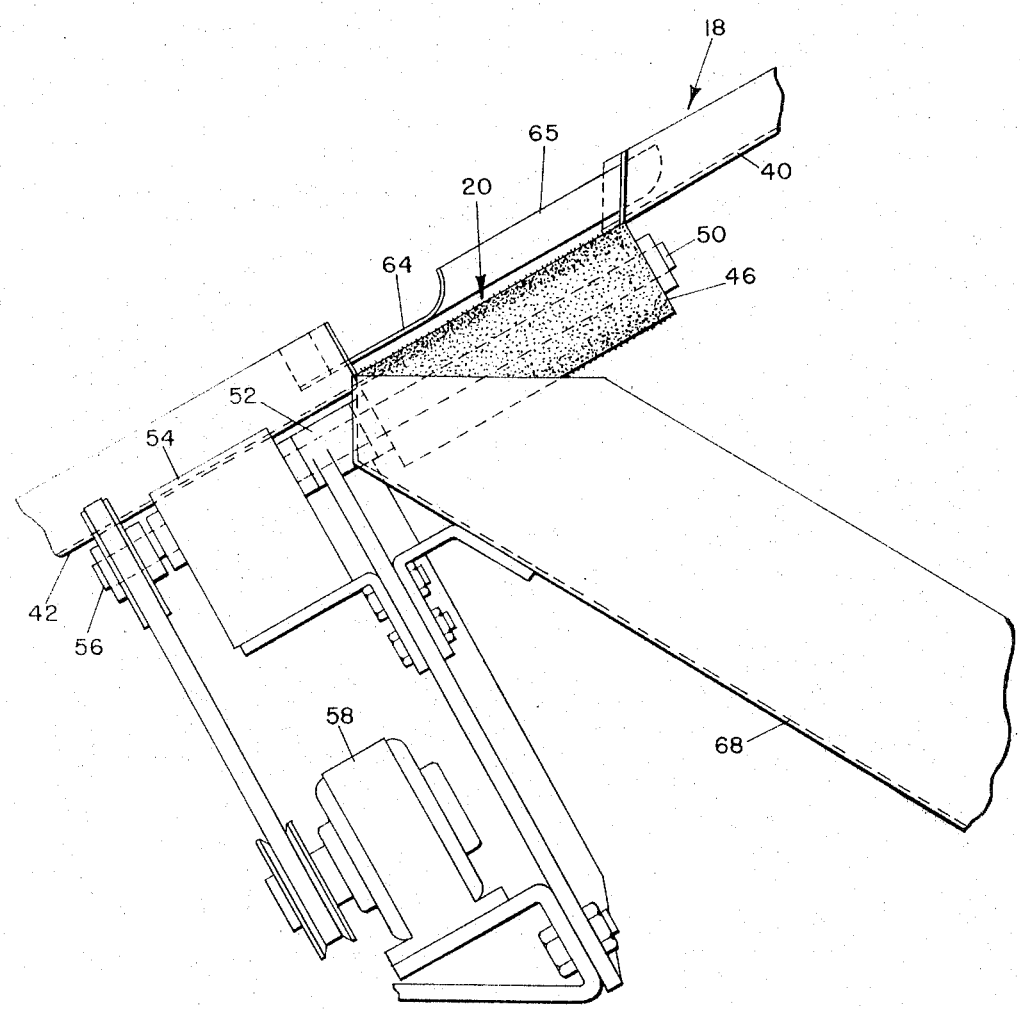
FIG. 4 is a detail view in side elevation of the device shown in FIG. 3.

As illustrated in detail in FIGS. 3 and 4, the transversely extended reject belt 20 is interposed in a space between an upper portion 40 and a lower portion 42 of the chute 18. The chute is arranged at an incline of about thirty degrees from the horizontal, and the upper surface of the transverse belt 20 is aligned with the incline of the chute as shown so that the closures must pass across the belt in their travel down the chute. The belt is arranged to run over the pulleys 44, 46 carried by shafts 48, 50 journaled in suitable bearings attached to the machine frame. The shaft 50 is coupled to the output shaft 52 of a speed reducing unit 54, and the input shaft 56 of the unit is belted to a motor 58. In practice, the linear speed of the belt is approximately 100 feet per minute which approximates a ratio of about two to one with relation to the speed of the closures traveling down the chute by gravity when they reach the belt.

As herein shown, the upper portion 40 of the chute overlaps the upper edge of the belt 20, and the lower portion 42 of the chute underlies the lower edge of the belt to permit free sliding movement of the oriented or open end up closures across the belt from the upper to the lower portion of the chute.

The surface texture of the belt 20 must be of a character such as to permit those closures which are oriented with their open ends up to slide freely across the moving belt onto the lower portion 42 of the chute to be guided onto the orienting disk and must also be such as to frictionally impede or stop the flow of those closures which are disposed with their open or rim ends down. Such a surface may comprise a base structure 60 having upstanding flexible tufts or bristles of natural or synthetic fibers as indicated at 62. In practice, it was found that a piled fabric, such as rug material, was suitable for this purpose. As illustrated in detail in FIG. 5, it will be seen that in operation when a closure with its closed end down slides onto the fast moving belt it will ride on top of the flexible fibers with a minimum of friction and is enabled to traverse the width of the moving belt without being carried laterally out of the chute. On the other hand, when a closure with its closed or rim end down slides onto the belt, the rim portion of the closure will be engaged by the upstanding flexible fibers to impede the movement of the closure and to carry the closure laterally out of the chute.

In operation, the randomly arranged closures deposited onto the upper end of the chute are unrestricted and may assume different positions during their progress down the chute. Thus, some closures will lie flat against the chute in either their open end up or open end down position. Others may be supported on edge or may roll or tumble. Still others may become nested or will ride one on top of the other. In order to prevent passage of closures across the belt other than those which lie flat and are oriented with their open ends up or down, a top plate 64 is supported above the belt providing about one-eighth of an inch clearance over a closure supported flat on the belt. This expedient will prevent entrance of nested closures, tumbling or rolling closures, or closures riding one on top of the other and, as a result, such closures will be carried laterally out of the chute by the moving belt 20. The top plate 64 is bent upwardly at its forward end as indicated at 65 to form a guide for admitting flatly positioned closures thereunder, the limited clearance above the flatly positioned closure also serving to maintain the admitted closure in its flat position during its travel across the belt. In practice, an oriented closure sliding across the fast moving belt may be carried a short distance laterally during its sliding movement but not enough to carry it out of the chute. The forward edge 65 of the top plate is angularly arranged, as shown, to assist in guiding laterally those closures which fail to be admitted under the plate, such as those closures which are nested or which ride one on top of the other or those which are in any position other than a flat position. The closures which enter under the top late in a flat open end down position are arranged to travel a short distance onto the belt across a portion of the piled surface before they come to rest on the belt, such distance traveled depending on the weight of the closure and the velocity it has attained when it reaches the belt. Such unoriented closures will then be carried laterally with the belt out of the chute.

The closures thus removed from the chute by the belt 20 are arranged to fall off the end of the belt into a return chute 68 leading to the bulk supply hopper 12 to be again withdrawn by the conveyor 16 and deposited on the chute 18. The oriented closures which pass across the belt 20 are received on the lower portion 42 of the chute to be deposited onto the disk 10 and, as herein shown, the lower end of the chute portion 42 is also provided with a cover plate 70 to maintain the closures in their oriented position when they strike the disk. The plate 70 provides a clearance above the closures of about one-quarter of an inch, which is sufficient to prevent bouncing and overturning of an oriented closure guided onto the disk.

From the description thus far, it will be seen that the provision of a preorienting device in a closure handling and orienting machine assures that a substantial majority of the closures will be oriented with their open ends up when they are deposited onto the orienting disk 10 and, as a result, a high percentage of the closures thus deposited on the disk will be carried around by the disk through the orienting mechanism without being rejected from the serrated edge of the disk and will pass into the mouth of the feeed chute 28 for delivery to a closure applying machine, thereby greatly increasing the effiiciency of the apparatus. In actual testing of the present preorienting device, it was found that only an occasional unoriented closure with its open end down succeeded in passing across the belt to be deposited onto the disk 10, in the order of one closure per 300 which pass across the belt. Thus, percentagewise, better than ninety-nine percent of the closures which pass across the belt are disposed in an oriented position.

While the preorienting device is herein illustrated as embodied in a closure handling and orienting machine wherein the unoriented closures are rejected over the serrated edge of the orienting disk, as shown in my copending application Serial No. 423,911 above referred to, it will be apparent that the present preorienting device may also be used with advantage for supplying closures to other types of orienting apparatus, such as that illustrated and described in my United States Patent No. 2,715,978, issued August 23, 1955. It will also be apparent that the present preorienting device is capable of handling articles other than closures, such as hollow articles open at one end, and that the present device is also capable of handling conventional tab-free closures with equal advantage.

In further testing of present preorienting device, the closures were deposited onto a plain or unserrated rotary disk without provision for rejecting unoriented closures from the disk. Such a disk was provided with a spiral rail for aligning the closures one in back of another and advancing the line of closure to the marginal edge of the disk where they were deposited directly into the mouth of the feed chute 28. Thus, the present closure reject belt 20 may be considered as an orienting device by itself for delivering oriented closures to an aligning and advancing disk.

In practice, the surface texture of the reject belt 20 may comprise upstanding flexible elements of any suitable material in the nature of a piled surface and capable of intercepting the flow thereacross of those closures which are positioned with their open or rim ends down whereby to effect removal of such closures while permitting those closures positioned with their open ends up to slide across the surface to be deposited onto the orienting disk of the closure orienting and feeding apparatus.

While the preferred embodiment of the invention has been herein illustrated and described, it will be understood that the invention may be embodied in other forms within the scope of the following claims.

Having thus described the invention, what is claimed is:

1. In a closure handling machine of the character described, in combination, means for supplying hollow closures open at one end to the machine including a delivery chute having upper and lower portions arranged to receive randomly arranged closures deposited on said upper portion, and orienting means cooperating with said chute comprising a transversely extended moving belt interposed between said upper and lower portions, said belt having a piled surface such as to permit passage thereacross of those closures positioned with their open ends up, the piled surface of said moving belt arranged to impede the passage of those closures positioned with their open ends down and to carry such closures out of the chute.

2. In a closure handling machine of the character described, in combination, means for supplying hollow closures open at one end to the machine including a delivery chute having upper and lower portions arranged to receive randomly arranged closures deposited on said upper portion, and orienting means cooperating with said chute comprising a transversely extended moving belt interposed between said upper and lower portions, said belt having a surface such as to permit passage thereacross of those closures positioned with their open ends up, said moving belt arranged to impede the passage of those closures positioned with their open ends down and to carry such closures out of the chute, and a cover plate disposed above said belt providing a clearance sufficient to permit passage thereunder of those closures lying flat in the chute, said cover plate arranged to prevent admission of nested closures and those closures riding one on top of the other to be carried out of the chute by the belt.

3. In a closure handling machine of the character described, in combination, means for supplying hollow closures open at one end to the machine including a delivery chute having upper and lower portions, a bulk supply hopper, means for withdrawing randomly arranged closures from said supply hopper and depositing the same onto said upper portion of the chute, orienting means cooperating with said chute comprising a transversely extended moving belt interposed between said upper and lower portions, said belt having a surface comprising upstanding flexible elements such as to permit passage thereacross of those closures positioned with their open ends up, said upstanding flexible elements arranged to impede the passage of those closures positioned with their open ends down whereby such closures are removed from the delivery chute by the moving belts, and a return chute for receiving the removed closures and returning the same to said supply hopper.

4. In a closure handling machine of the character described, in combination, means for supplying to the machine hollow closures open at one end including a delivery chute for receiving randomly arranged closures, and a transversely extended moving belt disposed intermediate the ends of said chute, said belt having a surface such as to permit passage thereacross of those closures positioned with their open ends up, and arranged to impede the passage of those closures positioned with their open ends down during their travel down the chute and to carry such closures out of the chute, said belt surface comprising a base member having upstanding flexible elements in the nature of a piled surface.

5. A closure handling machine as defined in claim 4 wherein the delivery chute is arranged at an angle of about thirty degrees from the horizontal.

6. A closure handling machine as defined in claim 4 wherein the speed of the belt is in the ratio of about two to one relative to the attained speed of the closures passing down the chute prior to being intercepted by the moving belt.

7. In a machine for handling and feeding hollow closures open at one end, in combination, a continuously rotated disk provided with a stationary spiral rail for guiding closures deposited on the disk into a single line to the outer edge of the disk, a feed chute cooperating with the disk and into which the closures are deposited, means for supplying closures to the rotary disk including a delivery chute for receiving randomly arranged closures, and orienting means comprising a transversely extended continuously moving belt disposed intermediate the ends of said chute, said belt having a piled surface such as to permit passage thereacross of those closures positioned with their open ends up, said piled surface arranged to impede the passage and carry out of the chute those closures positioned with their open ends down during their travel down the chute whereby the closures are delivered to said rotary disk in an oriented position.

8. In a machine for orienting and feeding hollow closures open at one end, in combination, a continuously rotated orienting disk serrated along its periphery to provide spaced lands, a stationary spiral rail for guiding closures on the disk into a single line and for advancing the same to present each closure with a portion thereof extended beyond the edge of the disk, those closures presented to said edge with their open ends down arrange to be overbalanced and rejected from the disk, and those closures presented to the edge in an oriented position with their open ends up being balanced on said lands, a feed chute cooperating with the disk and into which said oriented closures are deposited, means for supplying closures to the orienting disk including a delivery chute for receiving randomly arranged closures, and preorienting means comprising a transversely extended continuosly moving belt disposed intermediate the ends of said chute, said belt having a surface comprising upstanding flexible elements such as to permit passage thereacross of those closures positioned with their open ends up, said upstanding flexible elements arranged to frictionally impede the passage and carry out of the chute those closures positioned with their open ends down during their travel down the chute whereby the closures are delivered to said rotary disk in a preoriented position.

9. A machine as defined in claim 8 wherein the lower end of the chute is provided with a cover plate extending therefrom and spaced upwardly from the upper surface of said rotary disk to prevent upward displacement of the closures delivered to the disk.

References Cited by the Examiner
UNITED STATES PATENTS 1,682,809 9/1928 Stewart.
2,909,282 10/1959 Simmons _____ 209—114 X
3,044,660 7/1962 Troll _____ 198—33 X EVON C. BLUNK, *Primary Examiner.*

EDWARD A. SROKA, *Examiner.*